L. H. FRAZER.
HAY LOADER.
APPLICATION FILED JAN. 14, 1909.
935,649.
Patented Oct. 5, 1909.
2 SHEETS—SHEET 1.
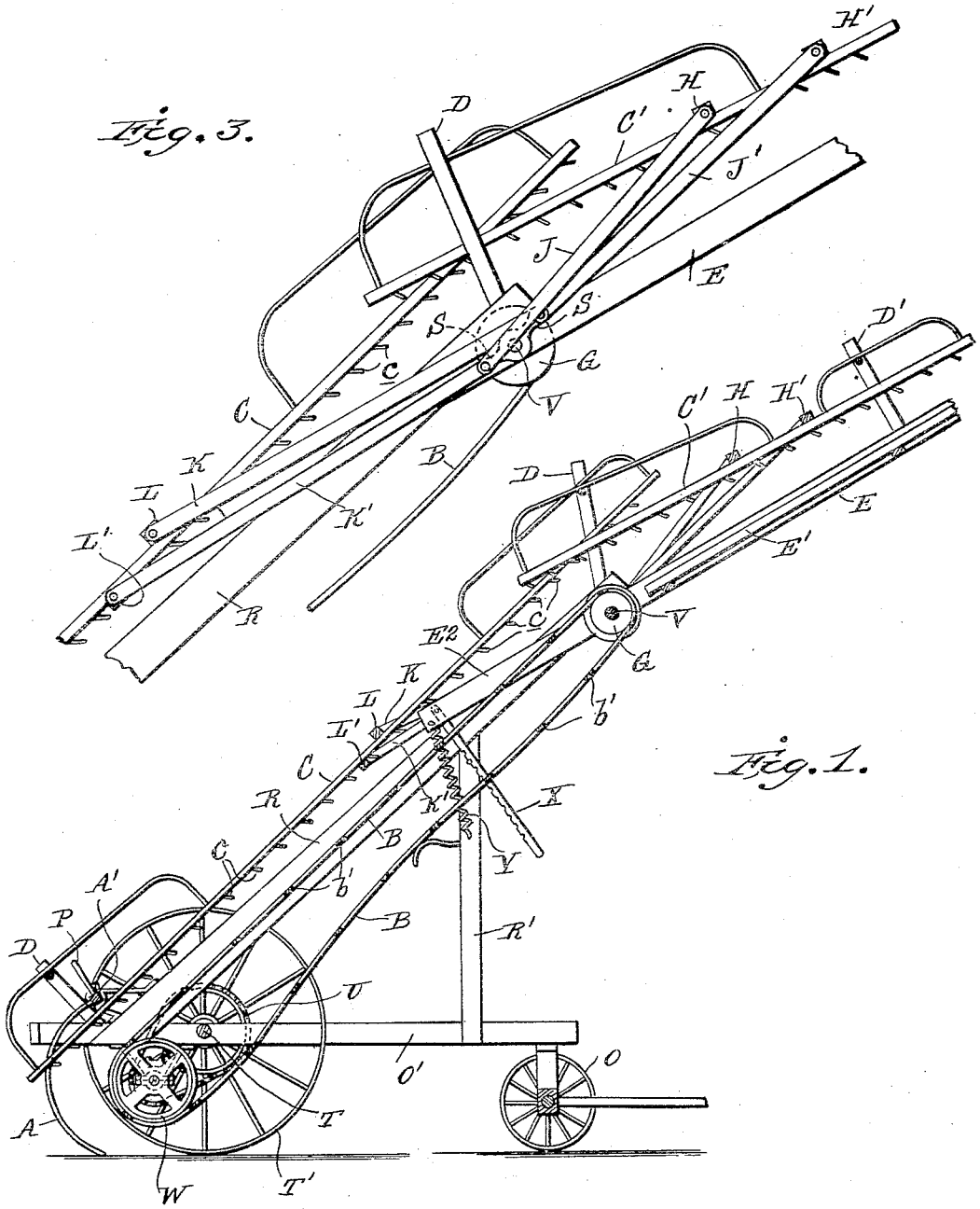
Witnesses
M. D. Church
E. Griffit
Inventor
Lafayette H. Frazer,
By Church & Church
his Attorneys

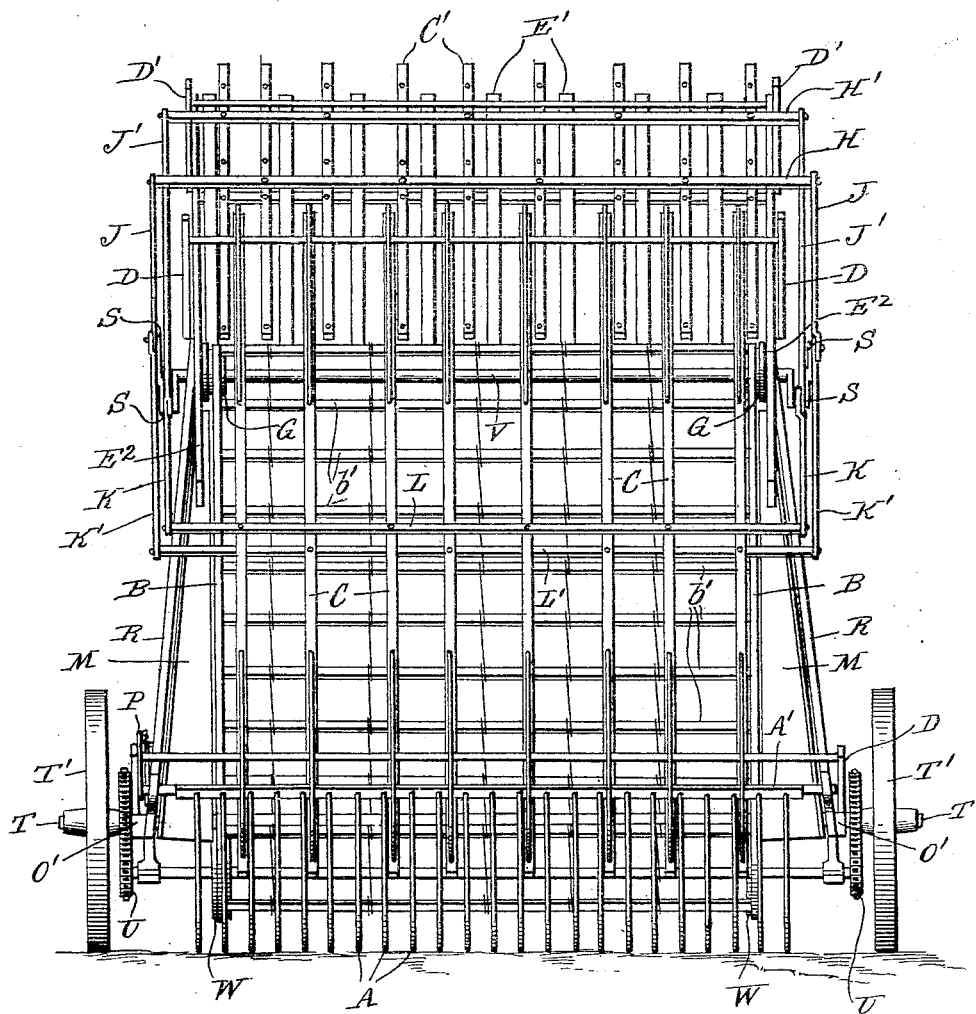

UNITED STATES PATENT OFFICE.

LAFAYETTE H. FRAZER, OF QUINCY, ILLINOIS.

HAY-LOADER.

935,649.     Specification of Letters Patent.     Patented Oct. 5, 1909.

Application filed January 14, 1909. Serial No. 472,307.

*To all whom it may concern:*

Be it known that I, LAFAYETTE H. FRAZER, of Quincy, in the county of Adams, State of Illinois, have invented a certain new and useful Improvement in Hay-Loaders; and I do hereby declare the following to be a full, clear, and exact description of the same, reference being had to the accompanying drawings, forming a part of this specification, and to the letters of reference marked thereon.

This invention relates to that type of hay loading apparatus adapted to gather the hay, straw or similar materials from the ground, elevate the same to a proper height and deposit it in a wagon or vehicle for removal from the field.

The invention consists in certain novel details of construction and combinations and arrangements of parts all as will be now described and pointed out particularly in the appended claims.

Referring to the accompanying drawings—Figure 1 is a side elevation partly in section of a hay loading machine embodying the present improvements. Fig. 2 is a rear elevation of the same, and Fig. 3 is an elevation of a portion showing the power connections for the walking rakes used in connection with the elevating mechanism.

The loader of the present invention is designed to be supported by four wheels, the front wheels indicated by O being adapted to turn on a center pivot and to be connected by a relatively short tongue with the rear of a wagon or vehicle into which the hay is to be loaded. A horizontal frame extends from the front wheels O toward the rear, said frame being preferably formed by side pieces O′, which, at a suitable point near their rear ends, are adapted to support the rear axle T and wheels T′.

Extending upwardly from the frame O′ in a diagonal direction are side pieces R supported at their forward ends by verticals R′ thus forming an upwardly and forwardly extending framework upon which the working parts of the elevating mechanism may be conveniently mounted. This elevating mechanism consists primarily of an endless belt formed by cross slats b′ connected together by chains or belting B and adapted to travel over pulleys W journaled in the lower end of the frame below the level of the axle and pulleys G journaled in the upper end of the frame in convenient position to deliver the hay carried up by the elevator to a chute formed by forwardly extending and adjustable slats E′ pivotally mounted on the shaft V of the pulleys G. In order to provide for the adjustment of the chute E the side pieces E² of the chute frame are extended in rear of the shaft V and adjustably connected with the main frame by a rack bar X and spring Y as will be readily understood from Fig. 1 of the drawings.

The elevator belt B is conveniently driven by sprocket wheel and chain connections U with the ground wheels T′ and clutch connections of well known construction are preferably interposed in order to permit of the loader being turned in a circle and to disconnect the driving mechanism while the loader is being transported from place to place. By passing the elevator belt about pulleys or drum W located below the level of the axle the belt is brought into such relation to the ground that the hay may be conveniently deposited thereon by accumulating between the rake teeth A and the lower end of the elevator belt. Said rake teeth A are preferably mounted on a cross bar A′ journaled on the frame and adapted to be rocked by a hand lever P for raising and lowering the rake teeth as is customary in horse hay rakes.

The gathering rake teeth A preferably curve around the lower rear end of the elevating belt thereby forcing the hay which is gathered by the teeth up over the lower end of the belt in which position it will rest in whole or in part on the rising flights or cross slats and be carried upwardly thereby, but in order to insure this action and to prevent any possibility of the hay being blown off or of accumulating in unwieldly or unmanageable masses, reciprocatory or "walking rake" bars are provided for operating over the top of the hay, being carried upwardly by the elevator and such "walking rakes", in effect constitute a part of the elevating mechanism. In the embodiment of the invention illustrated the rake bars referred to are indicated by the reference letters C, two sets being provided preferably moving simultaneously in opposite directions. One set of bars is connected with a reciprocatory cross bar L and the other set with the reciprocatory cross bar L′ as will be understood by reference to Fig. 2 of the drawings. These rake bars are adapted to rest on the hay being removed and at their lower ends project through between the rake teeth A, as shown in Fig. 1, thus insuring a proper coöperation of the elevating mechanism with any hay which may be accumulated by the said rake teeth A. For operating the bars C the cross bars L and L' are connected at their opposite ends by links K, K', with oppositely projecting crank arms S formed or mounted on the ends of the shaft V and adapted to be rotated by the elevator belt in its passage around the drum or pulleys G.

Tapered and inclined side boards M are provided at each side of the elevating mechanism to prevent the lateral escape of hay and in the preferred construction the said side boards M are flared more widely at the bottom than at the top as shown in Fig. 2, whereby the hay which may initially project from the sides of the elevating mechanism is pushed in toward the center as it is carried upwardly.

The chute frame E onto which the hay is delivered by the elevating mechanism is made adjustable in order to deliver or discharge the hay into the vehicle at various heights, thus it may be turned down during the initial loading operation and lifted as hay accumulates in the vehicle, thereby insuring the delivery at the proper height for distribution on the wagon. Inasmuch, however, as the chute frame, especially if inclined upwardly to deliver the hay at a high elevation, may offer some obstruction to the movement of the hay a "walking rake" bar conveyer mechanism is provided for forcing the hay to advance over or along the chute to the delivery or discharge point. This last mentioned conveyer mechanism embodies two series of pusher bars C', one series connected with the cross bar H and the other with the cross bar H'. Cross bars H and H' are connected by links J and J' respectively with the oppositely disposed cranks S before referred to, whereby the conveyer rakes are simultaneously reciprocated in opposite directions and in accord with the movements of the series of rakes C for assisting in elevating the hay to the discharge chute.

The several series of rake bars C and C' may be conveniently guided or held against lateral displacement by vertical guide frames D and D' projecting upwardly from the frames R and E, and the arrangement is such that the discharge or conveyer rakes C' may follow the movements of adjustment of the chute E whereby they are adapted to coöperate with the hay moving over said chute regardless of the position of the latter. The rake bars C and C' it will be understood are provided with inclined teeth or projections c on their under sides whereby they will engage the hay during their upward movement but will move freely in a downward direction.

In the preferred arrangement of the parts, the gearing for the elevator belt is such that the belt will move at a speed equal to the speed of movement of the elevator over the surface of the ground and the upward movement of the rake bars practically corresponds to the speed of movement of the elevator belt thereby preventing any interference of one with the movements of the other and preventing any tendency of the hay to move in a direction contrary to the direction in which it is to be elevated.

At no point during the elevation of the hay is it left unconfined and consequently at no point can it be blown from the elevator, even at the delivery end for the delivery end of the chute may be brought down close to the surface of the load and the hay deposited directly from the chute without being dropped through the air.

The apparatus is adapted to rake hay from the windrow as well as from the swath.

Having thus described my invention, what I claim as new and desire to secure by Letters Patent, is:

1. In a hay loader, the combination of the frame having the supporting wheels, the upwardly and forwardly inclined elevator belt mounted on pulleys journaled in said frame at top and bottom and collecting rake teeth in rear of the lower end of said belt, of the walking rake bars arranged parallel to and above the belt with their lower ends projecting through between the collecting rake teeth and mechanism operated by the belt for reciprocating said rake bars, whereby said bars assist in elevating the hay.

2. In a hay loader, the combination with the frame, ground wheels, upwardly extending elevator belt mounted on pulleys journaled in the frame at top and bottom the latter below the level of the axle, driving connections between the ground wheels and lower pulley and collector rake teeth located in rear of the lower end of the belt, of the reciprocatory rake bars extending substantially parallel with and above the belt with their lower ends projecting through between the collecting rake teeth, oppositely disposed crank arms driven by the belt and connections between said crank arms and reciprocatory rake bars for reciprocating alternate bars simultaneously in opposite directions whereby said bars assist in elevating the hay.

3. In a hay loader, the combination with the frame, ground wheels, elevating belt journaled on pulleys at top and bottom of said frame, collector rake teeth located in rear of the lower end of said belt, and reciprocatory rake bars located above the belt and movable toward and from the same, of a delivery chute pivotally mounted on the upper end of the frame, in position to receive the hay from the belt, means for holding said pivoted chute in adjusted position, conveyer rake bars located above said chute and means for reciprocating said last mentioned bars driven by the belt.

4. In a hay loader, the combination with the frame, ground wheels for supporting the same, upwardly extending elevator belt mounted on pulleys journaled in the top and bottom of the frame respectively, collector rake teeth in rear of the lower end of said belt, reciprocatory rake bars located above the belt and in position to overlie the hay being elevated by the belt, of a delivery chute pivotally mounted on the upper end of the frame in position to receive the hay from the belt, reciprocatory conveyer rake bars located above and adjustable with said chute, oppositely disposed crank arms driven by the belt and link connections between said crank arms and rake bars for reciprocating said bars.

5. In a hay elevator, the combination with the frame, ground wheels supporting said frame, elevator belt mounted on pulleys journaled in the top and bottom of said frame respectively, and collector rake teeth in rear of the lower end of said belt, of a delivery chute pivotally mounted on the upper end of the frame in position to receive the hay from the belt, adjusting mechanism for holding said chute at the desired inclination, independent reciprocatory rake bars located above the belt and chute respectively, and driving mechanism for reciprocating said bars in unison.

LAFAYETTE H. FRAZER.

Witnesses:
L. E. EMMONS,
L. E. EMMONS, Jr.